United States Patent [19]

Zeller

[11] Patent Number: 5,154,483

[45] Date of Patent: Oct. 13, 1992

[54] FLASHLIGHT WITH FLEXIBLE EXTENSION

[76] Inventor: Noel E. Zeller, c/o Zelco Industries, Inc. 630 S. Columbus Ave., Mount Vernon, N.Y. 10551-4445

[21] Appl. No.: 743,013

[22] Filed: Aug. 9, 1991

[51] Int. Cl.⁵ .............................................. F21L 7/00
[52] U.S. Cl. .................................................. 362/198
[58] Field of Search ....................................... 362/198

[56] References Cited

U.S. PATENT DOCUMENTS

| | | |
|---|---|---|
| 642,648 | 2/1900 | Van Duzer . |
| 1,108,350 | 8/1914 | Farber . |
| 1,692,394 | 11/1928 | Sundh . |
| 2,648,762 | 8/1953 | Dunkelberger ................ 362/198 |
| 3,103,723 | 9/1963 | Becker ............................ 362/198 |
| 3,118,614 | 1/1964 | Mosca . |
| 3,349,236 | 10/1967 | Sicho . |
| 3,393,312 | 7/1968 | Dahl . |
| 3,735,119 | 5/1973 | Williams, Jr. . |
| 3,852,587 | 12/1974 | Koehler . |
| 4,317,162 | 2/1982 | Richards et al. ............. 362/106 |
| 4,347,553 | 8/1982 | Saron ............................. 362/189 |
| 4,392,185 | 7/1983 | Grossman et al. ........... 362/105 |
| 4,443,831 | 4/1984 | Godfrey et al. .............. 362/80 |
| 4,495,550 | 1/1985 | Visciano ........................ 362/189 |
| 4,517,499 | 5/1985 | Saron ............................. 315/362 |
| 4,535,391 | 8/1985 | Hsiao ............................. 362/183 |
| 4,912,612 | 3/1990 | Giorgi ............................ 362/285 |

FOREIGN PATENT DOCUMENTS 971866 10/1964 United Kingdom .............. 362/198

*Primary Examiner*—Carroll B. Dority
*Attorney, Agent, or Firm*—Donald S. Dowden

[57] ABSTRACT

A flashlight comprises a housing adapted to accommodate batteries and an elongate extension having a proximal end connected to the housing and a distal end opposite the proximal end adapted to accommodate a light bulb. Electrically conductive leads carried by the extension are adapted to connect the battery to the bulb. The extension is formed of multiple strands of twisted copper wire or another material separate from the conductive leads that can be easily flexed by hand to assume a plurality of different shapes and that can retain a given shape indefinitely. The housing and the bulb can each be conveniently positioned and oriented independently of the other.

4 Claims, 4 Drawing Sheets

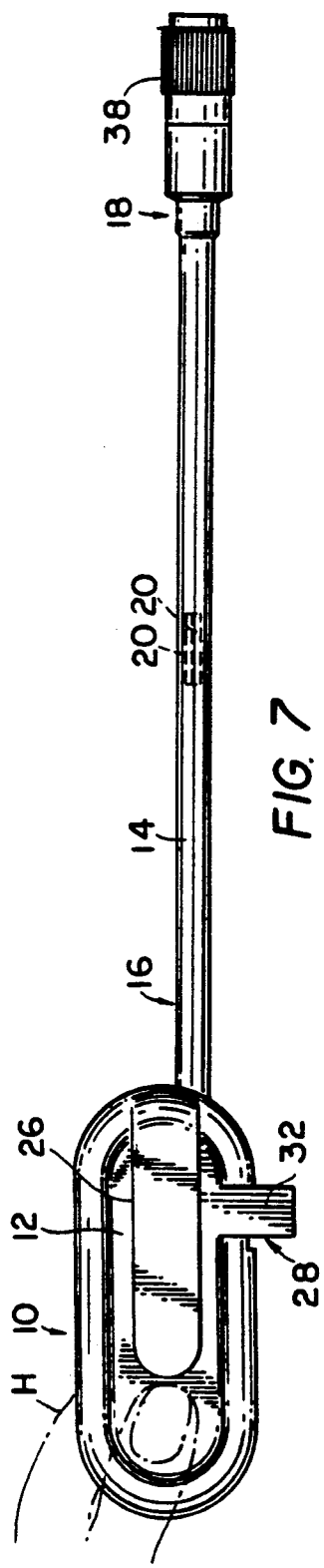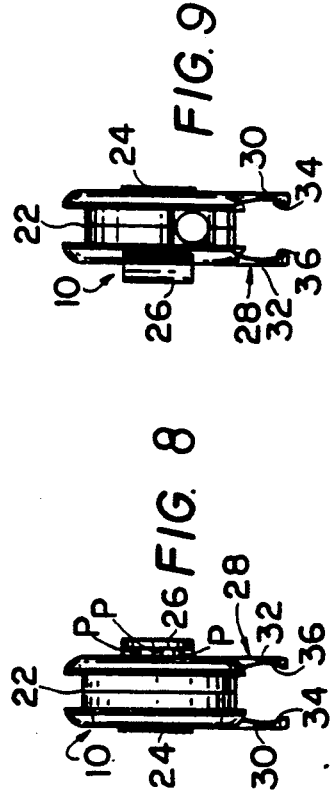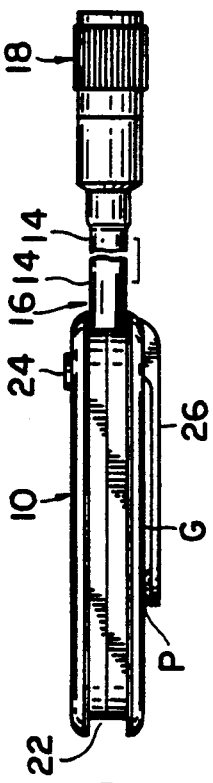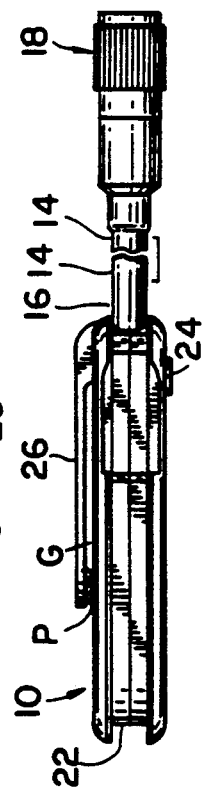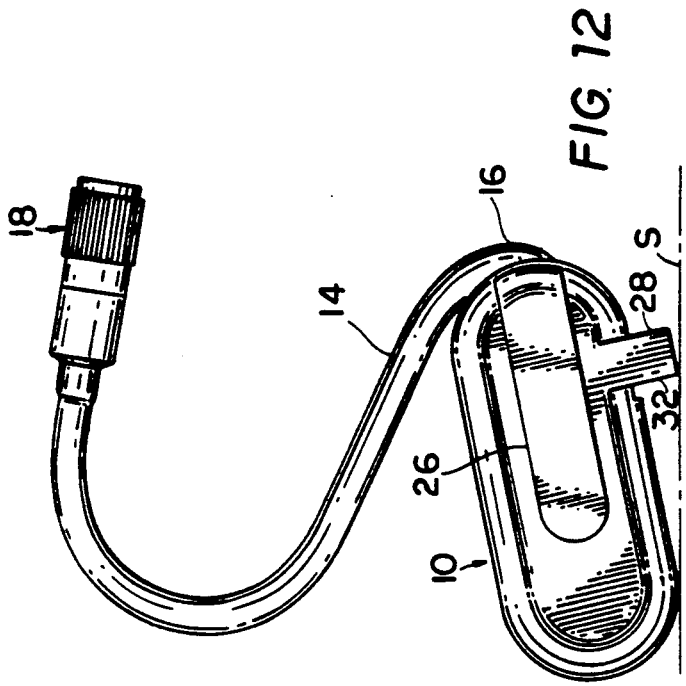

FLASHLIGHT WITH FLEXIBLE EXTENSION

BACKGROUND OF THE INVENTION

1. Field of the Invention

This invention relates to flashlights and more particularly to a novel flashlight that is more versatile than conventional flashlights.

2. Description of the Prior Art

Flashlights or electric torches have been known for many decades and have antecedents in flaming torches and lanterns that have been known for centuries. From time immemorial there has been a need for a portable source of light that can be used at night and at other times when the general illumination is poor.

The invention of the electric flashlight was a major advance in the technology of portable, personal light sources. As compared to older forms of such light sources, the electric flashlight has many advantages: it can be easily and instantly turned on and off, it is "clean" (not messy to handle), it produces no smoke or odor, it is silent in operation, it produces good illumination, and it is quite safe for use, even by children. Moreover, modern flashlights can be made small enough to fit easily into a pocket or purse or the glove compartment of a car. Even though small, they produce good illumination, especially in view of recent improvements in battery and bulb technology.

However, despite the excellent characteristics of modern flashlights, they have certain drawbacks. A major drawback of conventional flashlights is that they are awkward to use under certain circumstances, as when it is necessary to employ both hands to perform a task that requires illumination. Examples include operating a battery-powered screwdriver, cutting cloth with scissors, examining documents, writing (while steadying the paper), setting a watch, sorting clothes, and searching for a small object in a purse or briefcase. When the general illumination is low, persons performing these and similar tasks with the aid of a flashlight resort to tucking the flashlight under an arm, cradling it between the neck and shoulder, balancing it on a nearby table, mantel or ledge, even holding it in the mouth, etc.

None of these makeshifts is very satisfactory. If it is necessary, for example, to employ a tool under the hood of a car, it is pure happenstance if a way can be found to balance a conventional flashlight on some portion of the car's fender or engine in such a manner that it illuminates the work properly. Similarly, if during a power outage the contents of a briefcase on a table are to be searched with the aid of a conventional flashlight resting on a mantel, it is unlikely that the interior of the briefcase will be adequately illuminated. That may leave a choice of hoisting the briefcase substantially to the height of the mantel and tilting it precariously to illuminate the interior, thereby foregoing the use of one hand in rummaging through the contents of the briefcase, or, better, leaving the briefcase on the table, holding the flashlight in one hand and rummaging with the other. In either case, only one hand is available for the task presented, the other being committed to holding the briefcase or the flashlight.

Another drawback of conventional flashlights is that they are rather specialized. The familiar cylindrical flashlight is designed specifically to be held in the hand. It is not well adapted to be worn on a belt, for example. On the other hand, there are conventional "right-angled" flashlights specialized for wearing on the belt. Such flashlights typically have a cylindrical battery housing adapted to be secured to a belt by a clip so that the axis of the cylindrical housing is vertical. The light bulb, reflector and lens are constructed to project the light in a direction at right angles to the cylindrical housing axis, that is to say horizontally. Such a light can be worn to light the way while walking and frees the hands to carry camp gear, books, tools or whatever. However, except for this specialized use, the right-angled flashlight is no better than the straight cylindrical flashlight. It is, in other words, not very versatile.

Book lights specialized for reading in bed, while traveling, etc., as disclosed in applicant's earlier U.S. patents are also known, as are portable fluorescent lights as disclosed in applicant's earlier U.S. patent. Such lights can be designed to operate on house current, batteries, or both. A book light is excellent for its intended purpose, but, even if battery-powered, does not function as an all-purpose flashlight. A portable fluorescent light also gives excellent service, but it does not provide a complete solution to the problems of the prior art.

Another drawback of conventional flashlights is that they often will not reach an area in a crowded environment that requires illumination. The engine compartment of a modern car, for example, is crowded with hoses, belts and wires that limit access by tools. Sometimes it is necessary to illuminate a work area deeply recessed within the engine compartment so that a conventional flashlight must be held at a considerable distance from the work area. The tool in use may preempt the space along the line of sight to the work area, so that the flashlight must illuminate the work area from a different angle. When the flashlight cannot be brought close to the work area, the hoses, belts, wires, etc., may cast deep shadows that prevent adequate illumination of the work area.

Attempts have been made heretofore to improve the versatility of flashlights. For example, flashlights are commonly made with a focusing adjustment to enable selection of a floodlight or a spotlight. Also, flashlights are sometimes provided with lenses of different colors (red, yellow, clear, etc.) so that they can be used primarily for illumination (clear lens), warning (red lens), signaling (red lens, clear lens, etc.), illumination combined with adaptation to the dark (red lens), or another purpose. However, prior attempts to increase the versatility of the flashlight have met with only limited success, and the most advanced flashlights of today, while benefitting from recent improvements in battery and bulb technology, are in their basic design virtually indistinguishable from flashlights that were commercially available decades ago.

OBJECT AND SUMMARY OF THE INVENTION

An object of the invention is to remedy the drawbacks of conventional flashlights noted above. In particular, an object of the invention is to provide a flashlight that is more versatile and easier to use under a variety of conditions than any flashlight known heretofore. Another object of the invention is to provide a flashlight that can be used as a task light or as a clip-on light and that is compact yet has a reach long enough to be brought close to an area requiring illumination in a crowded environment.

The foregoing and other objects are attained in accordance with the invention by the provision of a flashlight comprising: a housing adapted to accommodate a source of power; an elongate extension having a proximal portion connected to the housing and a relatively distal portion adapted to radiate light; and energy-transfer means carried by the extension and adapted to transfer energy to the distal portion to facilitate the radiation of light from the distal portion; the extension being formed in such a manner that it can be easily flexed by hand to assume a plurality of different shapes and that can retain a given shape indefinitely; whereby the housing and the distal light-radiating portion can each be conveniently positioned and oriented independently of the other.

Preferably, the source of power is a pair of AAA batteries, the relatively distal portion is at the distal end of the extension and accommodates a light bulb, and the energy-transfer means comprises a pair of conductive leads adapted to connect the battery to the bulb to transfer energy to the distal light-radiating portion in the form of electricity. However, it is within the scope of the invention to generate the light in or near the housing and to employ fiber optics or another form of light guide to transfer energy to the distal light-radiating portion in the form of light.

BRIEF DESCRIPTION OF THE DRAWING

A better understanding of the objects, features and advantages of the invention can be gained from a consideration of the following detailed description of the preferred embodiment thereof, in conjunction with the appended figures of the drawing, wherein a given reference character always refers to the same element or part and wherein:

FIG. 7 is a view corresponding to FIG. 1 showing the extension in a second or long-reach configuration;

FIG. 8 is a view from the left of FIG. 7;

FIG. 9 is a view from the right of FIG. 7;

FIG. 10 is a broken view from the top of FIG. 7;

FIG. 11 is a broken view from the bottom of FIG. 7;

FIG. 12 is a view corresponding to FIGS. 1 and 7 showing the extension in a third configuration;

DESCRIPTION OF THE PREFERRED EMBODIMENTS

Figure 1:
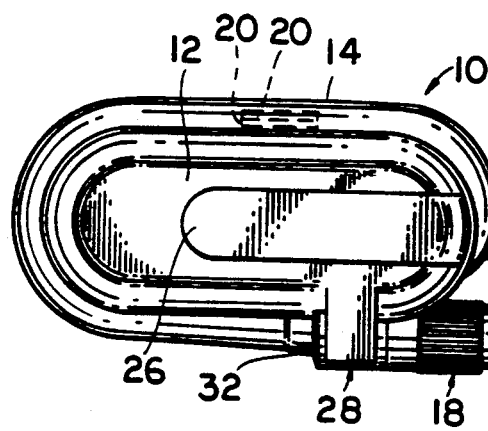
FIG. 1 is a view in side elevation of a flashlight constructed in accordance with the invention showing an elongate member in the form of a housing and its extension, the extension being coiled in a first or compact configuration.
Figure 2:
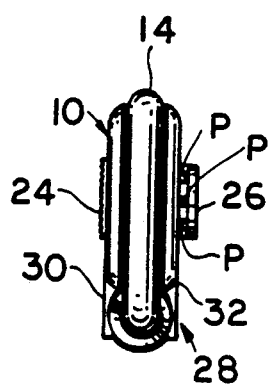
FIG. 2 is a view in elevation from the left side of FIG. 1.
Figure 3:
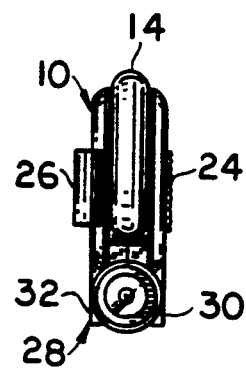
FIG. 3 is a view in elevation from the right side of FIG. 1.
Figure 4:
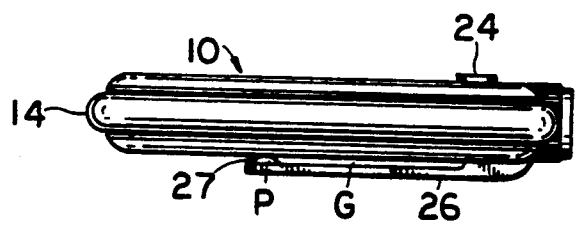
FIG. 4 is a view from the top of FIG. 1.
Figure 5:
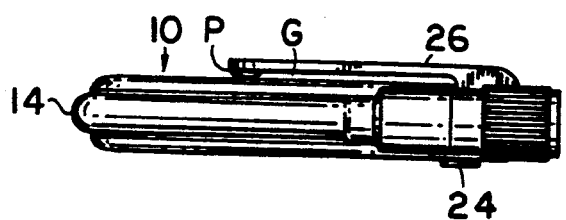
FIG. 5 is a view from the bottom of FIG. 1.
Figure 6:
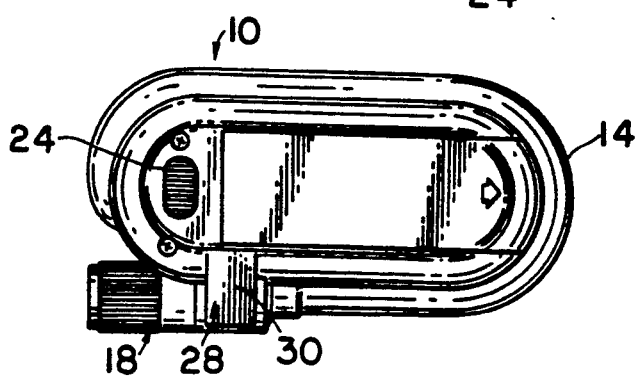
FIG. 6 is a view from the rear of FIG. 1.

The figures show a flashlight 10 constructed in accordance with the invention. The flashlight 10 comprises an elongate member formed as a housing 12 and an elongate extension 14. The housing 12 is adapted to accommodate one or more batteries (not shown), for example a pair of AAA batteries. The extension 14 has a proximal end 16 connected to the housing 12 and a distal end 18 opposite the proximal end 16 and adapted to a accommodate a light bulb (not shown). Conductive leads 20 carried by the extension 14 are adapted to connect the battery to the bulb. The extension 14 is formed in such a manner that it can be easily flexed by hand to assume a plurality of different shapes and can retain a given shape indefinitely. Examples of such construction are found in gooseneck lamps. Preferably, 7 or 8 strands of copper wire are twisted to form the gooseneck extension. Thus the housing 12 and the bulb can each be conveniently positioned and oriented independently of the other.

Figure 13:
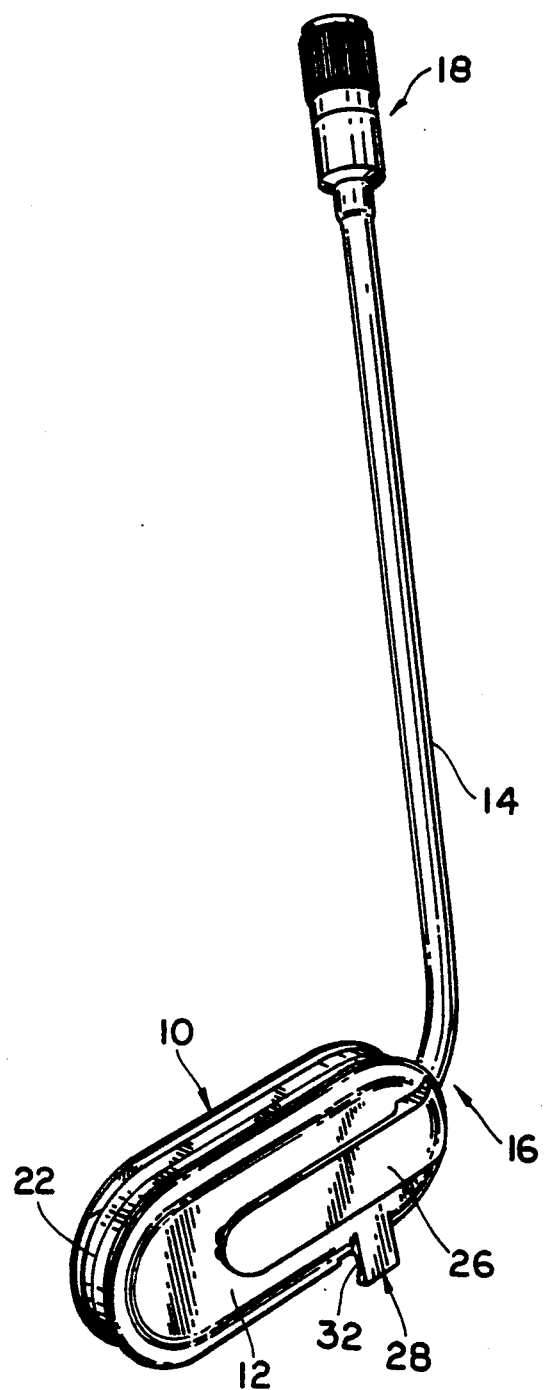
FIG. 13 is a perspective view showing the extension in a fourth configuration.
Figure 15:
FIG. 15 is a plan view of the inside of the battery cover.
Figure 14:
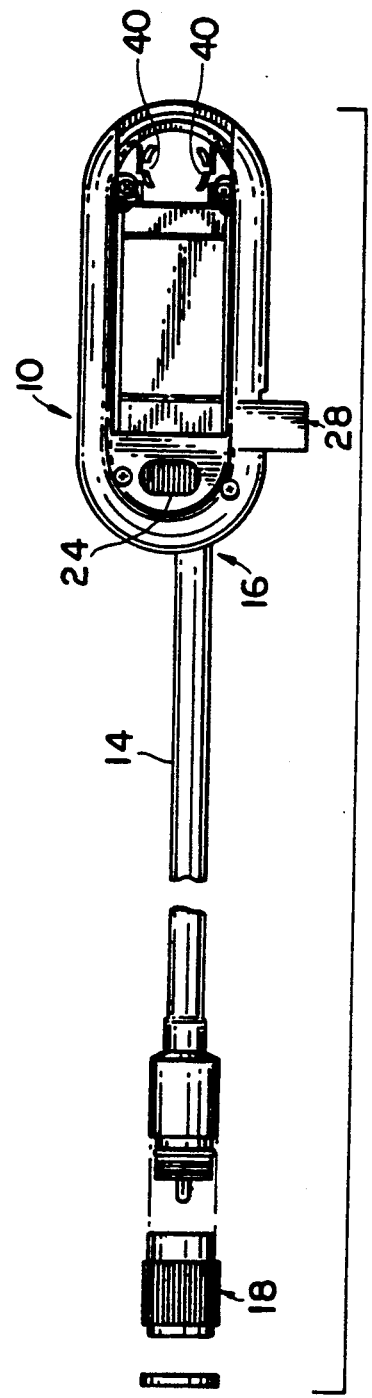
FIG. 14 is a broken view corresponding to FIG. 7 from the rear thereof, partly exploded and with a battery cover removed.

FIGS. 1-6 illustrate a first configuration or relative orientation of the housing 12 and bulb; FIGS. 7-11 and 14 illustrate a second relative orientation; FIG. 12 illustrates a third relative orientation; and FIG. 13 illustrates a fourth relative orientation. From these few examples, it is clear that the number of different possible relative orientations of the housing 12 and bulb is essentially unlimited.

In the first configuration or relative orientation, the extension 14 is coiled around the housing 12. As FIGS. 8-11 and 13 best illustrate, the housing 12 is formed with a peripheral groove 22 for accommodating the extension 14 so that the extension 14 can be wrapped around the housing 12 as illustrated in FIGS. 1-6. This provides a compact configuration for use, especially when the flashlight is held in the hand. In the configuration of FIGS. 1-6, the flashlight 10 is moreover adapted to be carried neatly in a pocket or purse or to be stored for easy access in the glove compartment of a car, a corner of a bureau drawer, a bedside stand, a hall table, etc.

The flashlight 10 includes a on-off switch 24 mounted on the housing 12 on one side thereof and a belt clip 26 mounted on the housing 12 on the other side thereof. With the extension 14 wound around the housing 12 and accommodated within the groove 22, the distal end 18 of the extension 14 is near the "head" end of the housing 12 where the on-off switch 24 and bulb are located (see FIG. 6). This enables convenient operation of the on-off switch 24 by the thumb of a hand holding the flashlight. The flashlight 10 thus can conveniently be held in the hand and operated as a compact flashlight. In a preferred size, in which it runs on a pair of AAA batteries, it has about the size (but not the shape or appearance) of a conventional penlight.

The clip 26 is a spring clip and has one or more protrusions P (FIGS. 2, 4, 5, 8, 10, 11) that bear against one surface of the housing 12. A gap G best shown in FIGS. 4, 5, 10 and 11 is thus left between the clip 26 and the housing 12. The gap G provides a space for accommodation of, for example, the belt of a user of the flashlight 10. The flashlight 10 can therefore be clipped to clothing such as the belt or a pocket of a user, and the extension 14 can be bent so that it projects light, for example, in the direction in which the user of the flashlight 10 is walking or towards a task in which the user is engaged. The light 10 thus functions in the manner of a "right-angled" flashlight of greatly expanded capability, in view of the unlimited freedom with which the light can be directed.

A retainer 28 comprising a pair of arms 30 and 32 is mounted on the housing 12 for engaging the extension 14 when the extension 14 is accommodated in the groove 22, thereby assisting in retaining the extension 14 in the groove 22. As FIGS. 8 and 9 best show, the arms 30 and 32 extend from opposite sides of the housing 12 in opposed parallel relation, and the surface of each arm that faces the other arm is concave. The outer rolled edges 34 and 36 of the arms 30 and 32 are separated by a distance slightly less than the diameter of the distal end 18 of the extension 14 so that, when the distal end 18 of the extension 14 is forced into the retainer 28, the arms 30 and 32 are first bent slightly away from each other. When the distal and 18 of the extension 14 is fully accommodated within the retainer 28, the arms 30 and 32 snap back substantially to their respective positions shown for example in FIGS. 8 and 9, and the rolled edges 34 and 36 prevent accidental dislodgement of the extension 14. At the same time, the flexibility of the arms 30 and 32 enables the distal end 18 of the extension 14 to be withdrawn from the retainer 28 by pulling the distal end 18 of the extension 14 away from the housing 12.

In the configuration of FIGS. 7–11 and 14, the flashlight 10 can be used to reach spaces in a crowded environment that would otherwise be inaccessible. As illustrated in FIG. 7, a hand H of a user may hold the flashlight 10 at a position considerably removed from the distal end 18 of the flashlight 10. Thus the flashlight is capable of being brought to bear on a workspace or other area of interest which, because of a crowded environment, may be inaccessible to conventional flashlights.

In the configuration of FIG. 12, the retainer 28 functions also as a base to assist in supporting the flashlight 10 on a supporting surface S. The flexibility of the extension 14 together with its ability to retain any shape it is given enables it to function as a gooseneck, as illustrated for example in FIG. 12. In the configuration of FIG. 13, the light is directed upwardly, for example against a low ceiling to provide general illumination. Note that the extension 14 can be oriented so that the light is projected in any direction. In FIG. 12, for example, the light is not limited to projection in the plane of the illustration; on the contrary, the extension 14 can be bent so that the light is projected into or out of the plane of the illustration, including directly away from or directly towards the viewer. Although not illustrated, the extension 14 can be looped or tied around a doorknob, basement pipe, protruding nail, etc. In short, there is no limitation on the direction in which the light can be projected, regardless of the orientation of the housing 12. Nor is there any limitation on the position of the bulb relative to the housing 12, so long as it is within the work space defined by the length of the extension 14.

In accordance with the invention, focusing means 38 is preferably mounted at the distal end 18 of the extension 14 for selecting a floodlight or a spotlight. The focusing means 38 comprises a main lens. Moreover, a mount 40 (FIG. 14) in the housing 12 accommodates a spare lens. The main lens may be, for example, clear and the spare lens red, but of course it is within the scope of the invention to employ lenses of other characteristics. Moreover, additional spare lenses can be accommodated in the housing 12. The mount 40 also accommodates a spare bulb.

The flashlight 10 is preferably made largely of plastic. In particular, the casing 12, on-off switch 24, spring clip 26 and retainer 28 can be made of plastic. The flashlight 10 is thus inexpensive to manufacture and can be made available to consumers at an affordable price.

Thus there is provided in accordance with the invention a flashlight that is more versatile than conventional flashlights. The flashlight remedies the drawbacks of conventional flashlights noted above and in particular is easier to use under a variety of conditions than any flashlight known heretofore. Moreover, the flashlight in accordance with the invention can be used as a task light or as a clip-on light and is compact yet has a reach long enough to be brought close to an area requiring illumination in a crowded environment.

Many modifications of the preferred embodiment of the flashlight disclosed above will readily occur to those skilled in the art upon consideration of this disclosure. For example, the length of the extension 14 can be varied within wide limits. Also, the flashlight can be made in different sizes and can be powered by batteries larger or smaller than AAA size. Moveover, as indicated above, the housing 12 may be attached to a portion of the extension 14 different from the illustrated place of attachment; or the housing 12 and extension 14 can be merged into a single elongate member, at least a portion of which is flexible and can retain a given shape indefinitely. Accordingly, the invention is not limited except by the appended claims.

I claim:

1. A flashlight comprising:
   a housing adapted to accommodate a source of power;
   an elongate extension having a proximal portion connected to the housing and a relatively distal portion adapted to radiate light; and
   energy-transfer means carried by the extension and adapted to connect the source of power to the distal portion to facilitate the radiation of light from the distal portion;
   the extension being formed in such a manner that it can be easily flexed by hand to assume a plurality of different shapes and can retain a given shape indefinitely;
   whereby the housing and the distal light-radiating portion can each be conveniently positioned and oriented independently of the other; and
   wherein the housing is formed with a peripheral groove for accommodating the extension so that the extension can be wrapped around the housing for storage and to provide a compact configuration for use.

2. A flashlight according to claim 1 further comprising a retainer mounted on the housing for engaging the extension when the extension is accommodated in the groove, thereby assisting in retaining the extension in the groove.

3. A flashlight according to claim 2 wherein, when the extension is accommodated in the groove, the retainer engages the extension near the distal end of the extension.

4. A flashlight according to claim 2 wherein the retainer functions also as a base to assist in supporting the flashlight on a supporting surface.

* * * * *

REEXAMINATION CERTIFICATE (3304th)

United States Patent [19]
Zeller

[11] B1 5,154,483
[45] Certificate Issued  Aug. 26, 1997

[54] FLASHLIGHT WITH FLEXIBLE EXTENSION

[76] Inventor: Noel E. Zeller, c/o Zelco Industries, Inc. 630 S. Columbus Ave., Mount Vernon, N.Y. 10551-4445

Reexamination Request:
No. 90/004,160, Mar. 1, 1996

Reexamination Certificate for:
Patent No.: 5,154,483
Issued: Oct. 13, 1992
Appl. No.: 743,013
Filed: Aug. 9, 1991

[51] Int. Cl.$^6$ ............................................. F21L 7/00
[52] U.S. Cl. ................................................. 362/198

[56] References Cited

U.S. PATENT DOCUMENTS

| | | |
|---|---|---|
| 642,648 | 2/1900 | Van Duzer . |
| 1,108,350 | 8/1914 | Farber . |
| 1,692,394 | 11/1928 | Sundh . |
| 2,648,762 | 8/1953 | Dunkleberger . |
| 3,103,723 | 9/1963 | Becker . |
| 3,118,614 | 1/1964 | Mosca . |
| 3,349,236 | 10/1967 | Sicho . |
| 3,393,311 | 7/1968 | Dahl . |
| 3,393,312 | 7/1968 | Dahl . |
| 3,735,119 | 5/1973 | Williams, Jr. . |
| 3,852,587 | 12/1974 | Koehler . |
| 4,317,162 | 2/1982 | Richards et al. . |
| 4,347,553 | 8/1982 | Saron . |
| 4,392,185 | 7/1983 | Grossman et al. . |
| 4,443,831 | 4/1984 | Godfrey et al. . |
| 4,495,550 | 1/1985 | Visciano . |
| 4,517,499 | 5/1985 | Saron . |
| 4,535,391 | 8/1985 | Hsiao . |
| 4,912,612 | 3/1990 | Giorgi . |

FOREIGN PATENT DOCUMENTS 971866  10/1964  United Kingdom .

*Primary Examiner*—Carroll Dority

[57] ABSTRACT

A flashlight comprises a housing adapted to accommodate batteries and an elongate extension having a proximal end connected to the housing and a distal end opposite the proximal end adapted to accommodate a light bulb. Electrically conductive leads carried by the extension are adapted to connect the battery to the bulb. The extension is formed of multiple strands of twisted copper wire or another material separate from the conductive leads that can be easily flexed by hand to assume a plurality of different shapes and that can retain a given shape indefinitely. The housing and the bulb can each be conveniently positioned and oriented independently of the other.

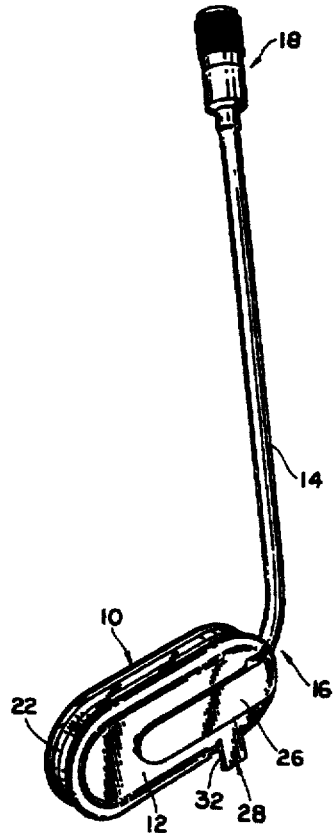

g# REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

Claims 3 and 4, dependent on an amended claim, are determined to be patentable.

New claims 5–7 and 8 are added and determined to be patentable.

1. A flashlight comprising:
 a housing adapted to accommodate a source of power;
 an elongate extension having a proximal portion connected to the housing and a [relatively] distal portion [adapted to radiate light] *having a light enclosed within a cylindrical housing*; and
 energy-transfer means carried by the extension and adapted to connect the source of power to the distal portion to facilitate the radiation of light from the distal portion;
 the extension being formed in such a manner that it can be easily flexed by hand to assume a plurality of different shapes and that can retain a given shape indefinitely;
 whereby the housing and the distal [light-radiating] portion *having a light* can each be conveniently positioned and oriented independently of the other; [and]
 wherein the housing is formed with a peripheral groove for accommodating the extension so that the extension can be wrapped around the housing for storage and to provide a compact configuration for use; *and*
 *wherein, when the extension is straight, the distal portion including the cylindrical housing and the proximal portion are coaxial.*

2. [A flashlight according to claim 1] *A flashlight comprising:*
 *a housing adapted to accommodate a source of power;*
 *an elongate extension having a proximal portion connected to the housing and a relatively distal portion adapted to radiate light; and*
 *energy-transfer means carried by the extension and adapted to connect the source of power to the distal portion to facilitate the radiation of light from the distal portion;*
 *the extension being formed in such a manner that it can be easily flexed by hand to assume a plurality of different shapes and that can retain a given shape indefinitely;*
 *whereby the housing and the distal light-radiating portion can each be conveniently positioned and oriented independently of the other; and*
 *wherein the housing is formed with a peripheral groove for accommodating the extension so that the extension can be wrapped around the housing for storage and to provide a compact configuration for use;*
 *further comprising a retainer mounted on the housing for engaging the extension when the extension is accommodated in the groove, thereby assisting in retaining the extension in the groove.*

*5. A flashlight according to any of claims 2–4 wherein the retainer is formed as a groove.*

*6. A flashlight according to any of claims 2–4 wherein the retainer is formed as a groove having outer rolled edges.*

*7. A flashlight according to any of claims 2–4 wherein the retainer is formed as a groove comprising arms extending from opposite sides of the housing in opposed parallel relation, the surface of each arm that opposes the other being concave, each arm being formed with an outer rolled edge separated from an outer rolled edge of the other arm by a distance slightly less than the diameter of the distal end of the extension so that, when the distal end of the extension is forced into the retainer, the arms are first bent slightly away from each other and, when the distal end of the extension is fully accommodated within the retainer, the arms snap back substantially to their respective original positions and the rolled edges prevent accidental dislodgement of the extension, while the flexibility of the arms enables the distal end of the extension to be withdrawn from the container by pulling the distal end of the extension away from the housing.*

*8. A flashlight according to any of claims 1–4 further comprising a pair of AAA batteries serving as a source of power.*

* * * * *